(12) United States Patent
Nishimura et al.

(10) Patent No.: US 7,081,321 B2
(45) Date of Patent: Jul. 25, 2006

(54) SEPARATOR FOR METAL HALOGEN CELL

(75) Inventors: Yoshifumi Nishimura, Moriyama (JP); Takuya Segawa, Moriyama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 617 days.

(21) Appl. No.: 10/276,096

(22) PCT Filed: May 29, 2001

(86) PCT No.: PCT/JP01/04494

§ 371 (c)(1), (2), (4) Date: Nov. 13, 2002

(87) PCT Pub. No.: WO01/93351

PCT Pub. Date: Dec. 6, 2001

(65) Prior Publication Data

US 2003/0108796 A1 Jun. 12, 2003

(30) Foreign Application Priority Data

May 30, 2000 (JP) ............................ 2000-160089

(51) Int. Cl.
*H01M 2/16* (2006.01)

(52) U.S. Cl. .................. 429/251; 429/252; 429/247; 264/45.9; 264/540; 264/211; 264/211.12; 428/315.7; 428/304.4; 428/339

(58) Field of Classification Search ............ 429/252, 429/247, 251; 264/45.9, 540, 211, 211.12; 428/304.4, 315.7, 339
See application file for complete search history.

(56) References Cited

U.S. PATENT DOCUMENTS

| 4,259,417 | A | | 3/1981 | Bellows et al. | |
| 4,784,924 | A | | 11/1988 | Savinell et al. | |
| 4,824,743 | A | | 4/1989 | Fujii et al. | |
| 5,032,450 | A | | 7/1991 | Rechlicz et al. | |
| 5,318,866 | A | * | 6/1994 | Degen et al. | 429/254 |
| 5,641,565 | A | * | 6/1997 | Sogo | 428/315.7 |
| 6,235,432 | B1 | * | 5/2001 | Kono et al. | 429/303 |
| 6,878,484 | B1 | * | 4/2005 | Tanaka et al. | 429/145 |
| 2002/0192560 | A1 | * | 12/2002 | Nishimura et al. | 429/252 |
| 2003/0113633 | A1 | * | 6/2003 | Nishimura et al. | 429/252 |
| 2004/0081886 | A1 | * | 4/2004 | Zuckerbrod et al. | 429/144 |
| 2004/0115523 | A1 | * | 6/2004 | Hommura et al. | 429/144 |

FOREIGN PATENT DOCUMENTS

| JP | 62-17945 A | 1/1987 |
| JP | 1-157071 A | 6/1989 |
| JP | 2-51877 A | 2/1990 |
| JP | 5-27233 B2 | 4/1993 |
| JP | 09031226 | 2/1997 |
| JP | 9-231957 A | 9/1997 |
| WO | WO 98/20063 A1 | 5/1998 |

OTHER PUBLICATIONS

Minegishi et al., Nihon Reoroji Gakkaishi vol. 25, No. 4, pp. 215-216 (1997).

* cited by examiner

*Primary Examiner*—Bruce F. Bell
(74) *Attorney, Agent, or Firm*—Birch, Stewart, Kolasch & Birch, LLP

(57) ABSTRACT

A separator for metal/halogen batteries is provided which is excellent in thermal resistance, resistance to stress-cracking and electric properties. A separator for metal/halogen batteries comprising a polyolefin having a viscosity average molecular weight of not less than 350,000 and not more than 2,000,000, in which polyolefin the proportion by weight of a polyolefin having a molecular weight of not less than 1,000,000 is not less than 15% and not more than 80%, and a hydrophilic fine particulate inorganic material(s), wherein the weight ratio of the polyolefins to the hydrophilic fine particulate inorganic material(s) is not less than 0.55 and less than 1, said separator having a pore volume of not less than 900 mm$^3$/g and a thickness of 0.2 to 1.0 mm.

4 Claims, 1 Drawing Sheet

SEPARATOR FOR METAL HALOGEN CELL

This application is the national phase under 35 U.S.C. 0 371 of PCT International Application No. PCT/JP01/04494 which has an International filing date of May 29, 2001, which designated the United States of America.

TECHNICAL FIELD

The present invention relates to a separator used in metal/halogen batteries, in particular, zinc/bromine batteries, which have been developed for use in electric power storage systems, electric vehicles, etc.

BACKGROUND ART

In general, characteristics required of a separator used in metal/halogen batteries are as follows.

1) The separator has an ionic conductivity, a low resistivity, and functions of reducing self-discharges with the metal and the halogen which occur at both electrode compartments.

2) The separator is a stable membrane which prevents halogen from diffusing particularly at an anode and is not deteriorated by strongly oxidizing halogen.

3) The separator is a membrane which is hardly swollen or deflected and can lengthen the life of the batteries.

4) The production cost of the separator is low.

In the present situation, ion-exchange membranes, fluorinated resin porous membranes and polyolefin porous membranes are used as separators which are considered as those having the characteristics described above. Of these, a separator comprising polyethylenes and fine particulate silica as disclosed in JP-B-5-27233 is inexpensive and excellent in resistance to oxidation.

The separator disclosed in JP-B-5-27233, however, is so poor in thermal resistance that as described in JP-A-62-17945, the separator is cracked by heating in a step of attaching an electrode frame to the separator by injection molding. Moreover, said separator has such a low resistance to stress-cracking that when the separator is used as a separator for a metal/halogen secondary battery for a long period of time, this membrane is cracked.

In order to remove these defects, there has been disclosed a technique of blending an ultra-high-molecular weight polyethylene as described in JP-A-9-231957. However, it cannot be said that this technique imparts sufficiently good electric properties, though the technique improves the thermal resistance and the resistance to stress-cracking.

Furthermore, when a polyolefin-based microporous membrane comprising polyolefins and silica is used as the main component of a separator, its bromine permeability is usually not sufficiently low, so that sufficient coulomb (Ah) efficiency cannot be attained. For solving this problem, there have been disclosed, for example, a means of adjusting the ratio between the numbers of silicon atoms (Si) and carbon atoms (C), which are exposed on the surface including the wall surfaces of the separator, i.e., the ratio Si/C to not less than 0.2 as determined by X-ray photoelectron spectroscopy (XPS), as described in JP-A-1-157071; and a means in which the porosity is adjusted to 45 to 50%, the pore volume to 750 to 850 mm$^3$/g, and the average pore radius to 1.5 to 2.0×10$^2$ Å as described in JP-A-2-51877.

Both of the separators disclosed in JP-A-1-157071 and JP-A-2-51877, however, have a large average pore size of 0.03 to 0.04 μm. Moreover, the separator disclosed in JP-A-2-51877 has a small pore volume of 750 to 850 mm$^3$/g and hence a high electric resistance of 0.004 Ω·100 cm$^2$/ separator. Thus, this separator is still unsatisfactory in electric properties.

DISCLOSURE OF THE INVENTION

An object of the present invention is to provide a separator for metal/halogen batteries which is free from the above problems.

The present inventors earnestly investigated in order to solve these problems, and consequently found that a separator for metal/halogen batteries which is excellent in thermal resistance, resistance to stress-cracking and electric properties can be obtained by specifying the proportion of an ultra-high-molecular weight polyolefin in the whole separator and the weight ratio of polyolefins to hydrophilic fine particulate inorganic material(s).

More specifically, said separator is a separator for metal/halogen batteries comprising a polyolefin having a viscosity average molecular weight of not less than 350,000 and not more than 2,000,000, in which polyolefin the proportion by weight of a polyolefin having a molecular weight of not less than 1,000,000 is not less than 15% and not more than 80%, and hydrophilic fine particulate inorganic material(s), wherein the weight ratio of the polyolefins to the hydrophilic fine particulate inorganic material(s) is not less than 0.55 and less than 1, said separator having a pore volume of not less than 900 mm$^3$/g and a thickness of 0.2 to 1.0 mm.

BEST MODE FOR CARRYING OUT THE INVENTION

Figure 1:
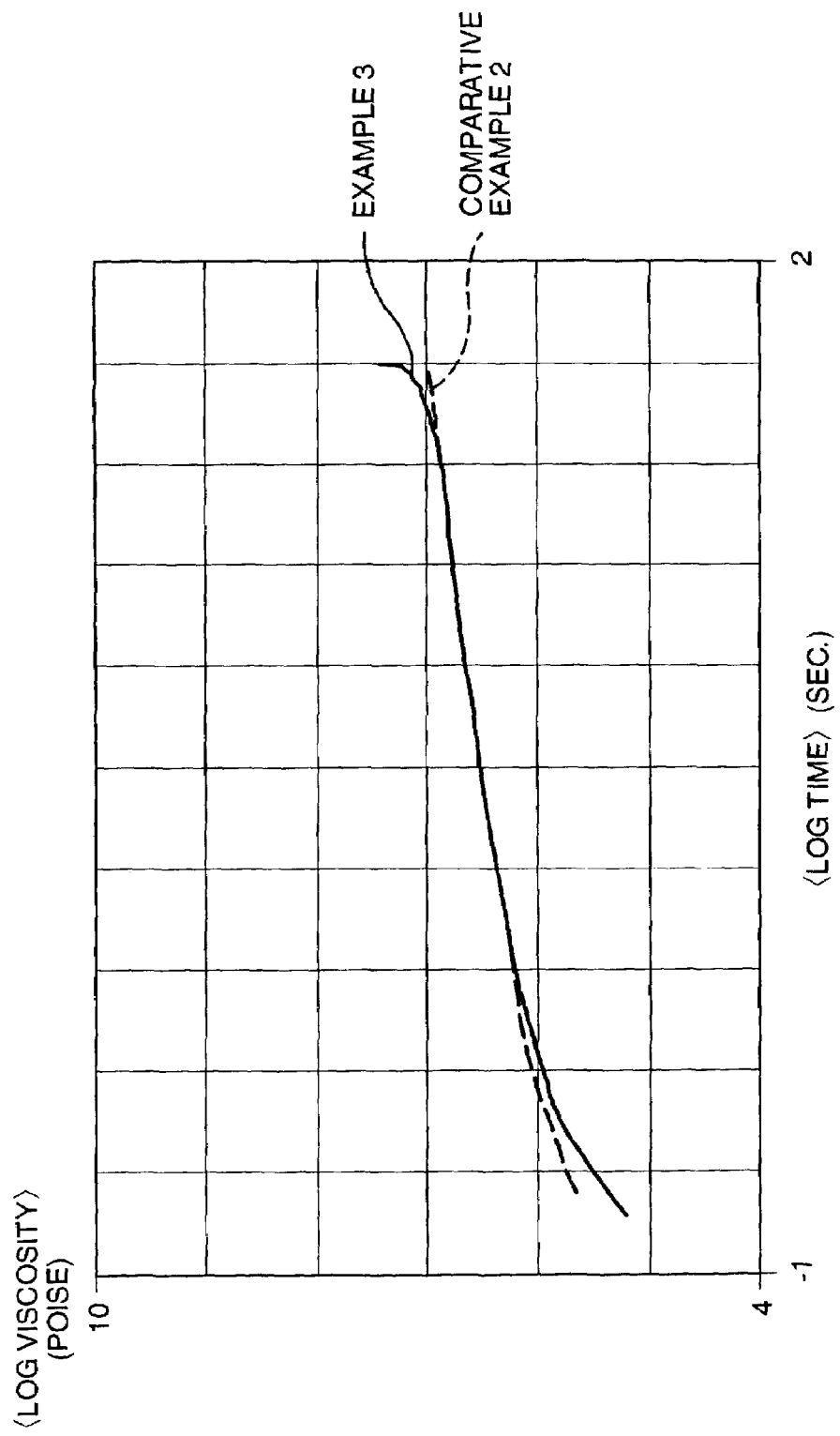
FIG. 1 shows the results of the measurement of elongational viscosity in Example 3 and Comparative Example 2.

The details of the present invention are described below.

The separator for metal/halogen batteries of the present invention comprises a polyolefin, which has a viscosity average molecular weight of not less than 350,000 and not more than 2,000,000, preferably 500,000 to 1,500,000. If the viscosity average molecular weight is less than 350,000, the separator is poor in mechanical strength and resistance to stress-cracking. If the viscosity average molecular weight is more than 2,000,000, melt fracture takes place, so that the separator has a low accuracy of thickness.

The separator for metal/halogen batteries of the present invention is suitably used particularly as a separator for zinc/bromine batteries.

The polyolefin used in the separator for metal/halogen batteries of the present invention should contain a polyolefin with a molecular weight of not less than 1,000,000 in a proportion by weight of not less than 15% and not more than 80%, preferably not less than 20% and not more than 70%. The content (%) (hereinafter referred to as proportion by weight) of the polyolefin with a molecular weight of not less than 1,000,000 referred to herein is determined by a known method from an integration curve obtained by GPC (gel permeation chromatography) measurements and weights. If the proportion by weight is less than 15%, the separator is poor in resistance to stress-cracking. If the proportion by weight is more than 80%, a composition having a low molding processability is obtained and it undergoes melt fracture and the like, so that the separator has a low accuracy of thickness.

As the polyolefin used in the present invention, there can be used well-known homopolymer and copolymer polyethylene resins such as high-density polyethylenes, low-density polyethylenes, linear low-density polyethylenes and the like, polypropylene resins and mixtures thereof. In particular, polyethylene resins having a density of 0.9 g/cm$^3$ to 0.99 g/cm$^3$ are preferably used. High-density polyethylene resins having a density of 0.93 g/cm$^3$ to 0.98 g/cm$^3$ are more preferably used because they impart a good thermal resistance. If necessary, additives such as antioxidants, ultraviolet absorbers, lubricants, anti-blocking agents, colorants, flame retardants and the like may be added so long as they do not adversely affect the object of the present invention.

In addition, in the polyolefin resin used in the present invention, when the proportion by weight of polyolefin having a molecular weight of not more than 100,000 is not less than 2%, a satisfactory adhesion can be desirably attained in the attachment of an electrode frame to the separator by injection molding or welding using ultrasonic waves. When the proportion by weight of polyolefin having a molecular weight of not more than 100,000 is not more than 11%, the retention of tensile elongation in the notch MD direction is desirably high. The proportion by weight of polyolefin having a molecular weight of not more than 100,000 is determined by a known method from an integration curve obtained by GPC (gel permeation chromatography) measurements and weights.

In the present invention, a hydrophilic fine particulate inorganic material(s) should be used in order to impart wettability by water. Such inorganic material(s) include fine particulate silica, calcium silicate, aluminum silicate, alumina, calcium carbonate, magnesium carbonate, kaolin clay, fine particulate talc, titanium oxide, diatomaceous earth, etc. Fine particulate silica is preferably used. These hydrophilic fine particulate inorganic materials may be used as a mixture of two or more thereof.

In the present invention, the weight ratio of the polyethylenes to the hydrophilic fine particulate inorganic material(s) should be not less than 0.55 and less than 1, preferably not less than 0.7 and not more than 0.95, more preferably not less than 0.8 and not more than 0.95. If the weight ratio is less than 0.55, the separator has a low mechanical strength. If the weight ratio is not less than 1.0, the separator has unsatisfactory electric properties.

In the present invention, the pore volume is preferably not less than 900 mm$^3$/g, more preferably not less than 1,000 mm$^3$/g and not more than 2,000 mm$^3$/g. The average pore diameter is preferably less than 0.03 μm, more preferably not less than 0.01 μm and not more than 0.027 μm. In addition, the pore diameter preferably has a maximum value of 0.01 to 0.02 μm in the pore diameter distribution. If the pore volume is less than 900 mm$^3$/g, the separator has unsatisfactory electric properties. If the average pore diameter is not less than 0.03 μm, the prevention of halogen permeation becomes insufficient, so that the separator has a low coulombic efficiency.

The lower limit of thickness of the separator of the present invention is 0.2 mm, preferably 0.4 mm, more preferably 0.5 mm. The upper limit of thickness of the separator is 1.4 mm, preferably 1.0 mm, more preferably less than 0.6 mm. If the thickness is more than 1.4 mm, the separator has unsatisfactory electric properties. If the thickness is less than 0.2 mm, the separator has a low mechanical strength.

The electric resistance of the separator of the present invention is preferably not more than 0.002 Ω·100 cm$^2$/separator, and its surface wettability by a waterdrop is preferably not more than 500 seconds. When the surface wettability by a waterdrop is not more than 500 seconds, the liquid permeability is improved, so that such a surface wettability by a waterdrop is effective in reducing the time taken in the construction of a battery and the initial electric resistance. The porosity is preferably 50 to 65%. If the porosity is less than 50%, the electric resistance is increased. If the porosity is more than 65%, the halogen is apt to be diffused and the strength tends to be decreased.

The separator for metal/halogen batteries of the present invention can be produced, for example, by the following process.

Polyolefins, a hydrophilic fine particulate inorganic material(s) and a plasticizer(s) are kneaded so that the weight ratio of the polyolefins to the hydrophilic fine particulate inorganic material(s) is not less than 0.55 and less than 1 and that the weight ratio of the plasticizer(s) to the hydrophilic fine particulate inorganic material(s) is not less than 1.5 and not more than 3.5. The kneaded product is extruded into a sheet, after which the plasticizer(s) is(are) extracted to obtain the separator for metal/halogen batteries.

At first, for example, an ultra-high-molecular weight polyolefin having a viscosity average molecular weight of not less than 1,000,000 and a polyolefin resin having a viscosity average molecular weight of not more than 400,000 are mixed so that the proportion by weight of a polyolefin having a molecular weight of not less than 1,000,000 is not less than 15% and not more than 80% and that the mixture has an overall viscosity average molecular weight of not less than 350,000 and not more than 2,000,000. When an ultra-high-molecular weight polyethylene is used as one of the above-mentioned polyolefins in the mixing, the presence of the ultra-high-molecular weight polyethylene can be recognized as an increase in the elongational viscosity on the long-term side by measuring the elongational viscosity (for example, Koubunshi, Vol. 41, p. 102–105, 1992).

Then, the polyolefins, a plasticizer(s) and a hydrophilic fine particulate inorganic material(s) are mixed so that the weight ratio of the polyolefins to the hydrophilic fine particulate inorganic material(s) is not less than 0.55 and less than 1 and that the weight ratio of the plasticizer(s) to hydrophilic fine particulate inorganic material(s) is not less than 1.5 and not more than 3.5.

The plasticizer(s) used in the present invention should be liquid and inactive during melt-shaping Examples of the plasticizer(s) are organic substances such as phthalate esters, e.g. diethyl phthalate (DEP), dibutyl phthalate (DBP), dioctyl phthalate (DnOP) and bis(2-ethylhexyl) phthalate (DOP), phosphate esters, liquid paraffins, etc. Of these, DBP, DnOP, DOP and mixtures thereof are especially preferable.

These three components, i.e., the polyolefins, the hydrophilic fine particulate inorganic material(s) and the plasticizer(s) can be sufficiently mixed by a conventional mixing method using a mixing machine such as a Henshel mixer, V-blender, Pro-shear mixer, ribbon blender or the like. The mixture is kneaded by means of a melt-kneading apparatus such as an extruder, kneader or the like. The resulting kneaded product is melt-shaped into a sheet by the use of a T-die. In this case, the shaping is preferably conducted through a gear pump from the viewpoint of dimensional stability. In particular, the shaping is preferably conducted while controlling the fore pressure for the gear pump at a constant pressure, from the viewpoint of dimensional stability.

In addition, in the present invention, the following methods can be adopted as a method for cooling during the melt extrusion of the kneaded product: a method of cooling the extruded resin with air; a method of cooling the extruded resin by bringing the same into contact with a roll adjusted to a temperature 20 to 120° C. lower than the temperature of the resin discharged through the T-die; and a method of cooling the extruded resin while calendering the same into a sheet with calendering rolls having a temperature 20 to 120° C. lower than the temperature of the resin discharged through the T-die. The method of cooling the extruded resin while calendering the same into a sheet with calendering rolls having a temperature 20 to 120° C. lower than the temperature of the resin discharged through the T-die is preferably adopted from the viewpoint of uniformity of thickness. When the rolls are used, the shaping is preferably conducted while keeping the distance between the T-die and the point of contact between the roll and the sheet in a range of 100 to 500 mm. The temperature at discharge from the die can be measured by bringing the probe of a conventional thermocouple into contact with the discharged resin without bringing the probe into contact with the die. The pore volume can be adjusted by choosing the mixing ratio among the three components, i.e., the polyolefins, the hydrophilic fine particulate inorganic material(s) and the plasticizer(s), and the cooling conditions during the shaping step.

Next, the plasticizer(s) in the membrane obtained by adopting any of the methods described above is extracted with a solvent, followed by drying. As the solvent used for extracting the plasticizer(s), there can be used organic solvents such as methanol, ethanol, methyl ethyl ketone, acetone, etc.; and halogenated hydrocarbon solvents such as methylene chloride, etc.

In providing the separator of the present invention economically, it is efficient to carry out the extraction of plasticizer(s) and the drying continuously after the shaping into a sheet. For this purpose, it is desirable that the sheet is not broken by shrinkage stress produced by shrinkage of the membrane due to the extraction and drying. For preventing breakage, the retention of tensile elongation in the notch MD direction, described hereinafter, is preferably not less than 25%, more preferably not less than 35%.

Thus, the separator for metal/halogen batteries of the present invention can be produced.

The present invention is illustrated below in further detail with Examples and Comparative Examples but is not limited to those Examples. The physical properties referred to in the Examples were determined by the following measuring methods.

(1) Viscosity average molecular weight (Mv)

A separator from which silica had been extracted by adopting the production process of a single polyolefin film described hereinafter was dissolved in a solvent (decalin), after which the intrinsic viscosity [η] of the solution was measured at a measuring temperature of 135° C., and the viscosity average molecular weight was calculated by either of the following equations. In the case of a mixture, viscosity average molecular weight was calculated by the equation for the main component of the mixture.

In the case of polyethylene:

$$[\eta]=6.2\times10^{-4} \text{Mv}^{0.7} \quad \text{(Chiang's equation)}$$

In the case of polypropylene:

$$[\eta]=1.1\times10^{-4} \text{Mv}^{0.8}$$

(2) Proportion by weight of a polyolefin having a molecular weight of not less than 1,000,000 and the proportion by weight of a polyolefin having a molecular weight of not more than 100,000

A separator from which silica had been extracted by adopting the production process of a single polyolefin film was dissolved in a solvent and subjected to GPC measurement, and the proportions by weight were estimated from integration curves and weights.

GPC measurement apparatus: WATERS 150-GPC.
Temperature: 140° C.
Solvent: 1,2,4-trichlorobenzene.
Concentration: 0.05% (injecting amount: 500 μl).
Columns: Shodex GPC AT-807/S (one column) and Tosoh TSK-GEL GMH6-HT (two columns).
Dissolving conditions: 160° C., 2.5 hours.
Calibration curve: Standard polystyrene samples were subjected to measurement and third-order calculations were carried out by using a conversion factor for polyethylene (0.43) or a conversion factor for polypropylene (0.64). In the case of a mixture, calculations were carried out by using a conversion factor for the main component of the mixture.

(3) Density of polyolefin (g/cm$^3$)

A film obtained by the production process of a single polyolefin film was made transparent and freed of air contained in the film with a cold press, after which the density was measured by using a density-gradient tube.

(4) Thickness of membrane (mm)

Measured with a micrometer.

(5) Pore volume, average pore diameter and pore diameter distribution

Measured by a mercury injection method.

A sample was cut into a piece about 25 mm square, which was placed in a 15-ml cell and subjected to measurement at an initial pressure of about 10 kPa.

Apparatus: Shimadzu Autopore Model 9220.
Average pore diameter was calculated as 4V/A
wherein V: pore volume, and A: pore surface area.

(6) Mechanical properties

Measured with a tensile strength tester according to JIS K7127.

(7) Retention of tensile elongation in the notch MD direction

With a cutter, a notch of 1 mm was made at the edge of a sample placed in the MD direction (machine direction), among samples for measuring the above-mentioned mechanical properties, in the middle of a portion of the sample which was held with chucks. The tensile elongation of the sample was measured in the same manner as in the measurement of the mechanical properties and compared with the value of tensile elongation obtained in the measurement of the mechanical properties, whereby the retention of tensile elongation in the notch MD direction was evaluated.

Retention of tensile elongation in the notch MD direction=notch tensile elongation/unnotched tensile elongation (8) Electric properties Evaluated by electric resistance according to JIS C-2313.

(9) Elongational viscosity measurement

Measured with MELTEN Rheometer manufactured by TOYOSEIKI Co., Ltd.

Measurement temperature range: 160 to 200° C.
Strain velocity: 0.05 to 2.0 (/sec)

Production of a sample for measuring elongational viscosity:

Each of the films obtained by the production process of a single polyolefin film was held between polyimide films and pressed with mirror plates with heating at 200° C. to be melted. Then, the molten films were placed one upon another and molded into a rod by hot-pressing at 260° C. by the use of a mold. Thus, a sample for measuring elongational viscosity was produced.

(10) Production process of a single polyolefin film

A separator was immersed in alcohol, substantially freed of air contained therein, immersed in a 20% aqueous caustic soda solution at 80° C. for 24 hours, washed with warm water at 60° C., and then washed with running water for 24 hours. The film thus obtained was dried in a dryer set at 40° C. for 24 hours. A part of the resulting film was subjected to measurement by the method for measurement of remaining hydrophilic fine particulate inorganic material described hereinafter, to confirm that the amount of the remaining hydrophilic fine particulate inorganic material was not more than 1 wt %.

(11) Method for analysis of polyolefin/hydrophilic fine particulate inorganic material composition Using about 10 mg of a sample, the initial weight of the sample in an air stream and the weight of the sample after standing at 550° C. for 60 minutes were measured by means of a thermogravimetric analyzer TG/DTA 220 manufactured by Seiko Instruments Inc., and the composition of a sample was determined from these weights.

(12) Method for analysis of remaining hydrophilic fine particulate inorganic material In a crucible whose weight had been previously made constant, a separator that had been weighed was allowed to stand at 900° C. for 3 hours, and the weight of the residue obtained after complete combustion of a polyolefin component in the crucible was measured. The proportion (wt %) of the remaining hydrophilic fine particulate inorganic material was estimated from the ratio of the weight of the residue to the weight of the separator.

(13) Surface wettability

A waterdrop (0.1 ml) was allowed to fall on the surface of a separator, and the time required for the waterdrop to permeate the separator completely after the falling was measured.

(14) Weldability

After 40 separators were welded to a polyethylene frame by ultrasonic welding, the percentage of separators showing unsatisfactory adhesion between the membrane and the frame was calculated as weldability.

(15) Thermal resistance

After 40 separators were welded to a polyethylene frame by ultrasonic welding, the percentage of separators having membrane cracks was calculated as thermal resistance.

(16) Resistance to stress-cracking

After 20 separators were used as separators for zinc/bromine secondary batteries, they are taken out and the percentage of separators having membrane cracks was calculated as resistance to stress-cracking.

EXAMPLE 1

In a super-mixer, 23.5 wt % of fine particulate silica, 56.5 wt % of bis(2-ethylhexyl) phthalate (DOP), 8 wt % of an ultra-high-molecular weight polyethylene having a viscosity average molecular weight of 2,000,000 and 12 wt % of a high-molecular weight polyethylene having a viscosity average molecular weight of 300,000 were mixed. The resulting mixture was extruded with a 30 mmϕ twin-screw extruder equipped with a T-die of 450 mm in width at a temperature of the resin discharged through the T-die of 200° C. In this case, the mixture was extruded and melted through a gear pump while keeping the fore pressure for the gear pump constant. The resin discharged through the T-die was calendered with calendering rolls adjusted to a temperature of 140° C., to be shaped into a sheet of 0.65 mm in thickness.

The sheet thus shaped was immersed in methylene chloride for 1 hour to extract bis(2-ethylhexly) phthalate (DOP) therefrom, and the residue was dried. The characteristics of the separator thus obtained are shown in Table 1.

EXAMPLE 2

A separator was obtained in the same manner as in Example 1 except for using an ultra-high-molecular weight polyethylene having a viscosity average molecular weight of 3,000,000. The characteristics of the obtained separator are shown in Table 1.

EXAMPLE 3

A separator was obtained in the same manner as in Example 1 except for using 1 wt % of an ultra-high-molecular weight polyethylene having a viscosity average molecular weight of 3,000,000 and 19 wt % of a high-molecular weight polyethylene having a viscosity average molecular weight of 300,000. The characteristics of the obtained separator are shown in Table 1.

EXAMPLE 4

A separator was obtained in the same manner as in Example 1 except for using titanium oxide in place of fine particulate silica. The characteristics of the obtained separator are shown in Table 1.

EXAMPLE 5

In a super-mixer, 23.5 wt % of fine particulate silica, 56.5 wt % of bis(2-ethylhexyl) phthalate (DOP), 4 wt % of an ultra-high-molecular weight polyethylene having a viscosity average molecular weight of 2,000,000 and 16 wt % of a polypropylene (PN110G manufactured by TOKUYAMA CORPORATION) were mixed. Except for using the resulting mixture, a separator was obtained in the same manner as in Example 1. The characteristics of the obtained separator are shown in Table 1.

EXAMPLE 6

A separator was obtained in the same manner as in Example 1 except for using 28 wt % of fine particulate silica, 56 wt % of bis(2-ethylhexyl) phthalate (DOP), 6 wt % of an ultra-high-molecular weight polyethylene having a viscosity average molecular weight of 2,000,000 and 10 wt % of a high-molecular weight polyethylene having a viscosity average molecular weight of 300,000. The characteristics of the obtained separator are shown in Table 1.

EXAMPLE 7

A separator was obtained in the same manner as in Example 1 except for using 24 wt % of fine particulate silica, 54 wt % of bis(2-ethylhexyl) phthalate (DOP), 9 wt % of an ultra-high-molecular weight polyethylene having a viscosity average molecular weight of 2,000,000 and 13 wt % of a high-molecular weight polyethylene having a viscosity average molecular weight of 300,000. The characteristics of the obtained separator are shown in Table 1.

Comparative Example 1

In a super-mixer, 23 wt % of fine particulate silica and 54 wt % of bis(2-ethylhexyl) phthalate (DOP) were mixed, followed by adding thereto 9 wt % of an ultra-high-molecular weight polyethylene having a viscosity average molecular weight of 3,000,000 and 14 wt % of a high-molecular weight polyethylene having a viscosity average molecular weight of 300,000, and the above materials were mixed in the super-mixer. Except for using the resulting mixture, a separator was obtained in the same manner as in Example 1. The characteristics of the obtained separator are shown in Table 1.

Comparative Example 2

A separator was obtained in the same manner as in Example 1 except for mixing 23 wt % of fine particulate silica and 54 wt % of bis(2-ethylhexyl) phthalate (DOP) in a super-mixer and adding thereto 23 wt % of a high-molecular weight polyethylene with a viscosity average molecular weight of 300,000 as the sole polyethylene. The characteristics of the obtained separator are shown in Table 1

INDUSTRIAL APPLICABILITY

According to the present invention, a separator for metal/halogen batteries can be obtained which is excellent in thermal resistance, resistance to stress-cracking and electric properties.

The invention claimed is:

1. A separator for metal/halogen batteries comprising a polyolefin having a viscosity average molecular weight of not less than 350,000 and not more than 2,000,000, in which polyolefin the proportion by weight of a polyolefin having a molecular weight of not less than 1,000,000 is not less than 15% and not more than 80%, and a hydrophilic fine particulate inorganic material(s), wherein the weight ratio of the polyolefins to the hydrophilic fine articulate inorganic material(s) is not less than 0.55 and less than 1, said separator having a pore volume of not less than 900 mm$^3$/g and a thickness of 0.2 to 1.0 mm.

2. A separator for metal/halogen batteries according to claim 1, wherein said polyolefin has a proportion by weight of a polyolefin having a molecular weight of not more than 100,000 of not less than 2% and not more than 11%.

TABLE 1

| Item | Unit | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Thickness of membrane | mm | 0.59 | 0.59 | 0.59 | 0.59 | 0.59 | 0.59 | 0.59 | 0.59 | 0.59 |
| Polyolefin | | PE* | PE | PE | PE | PE/PP* | PE | PE | PE | PE |
| Hydrophilic inorganic material | | Fine particulate silica | Fine particulate silica | Fine particulate silica | Titanium oxide | Fine particulate silica | Fine particulate silica | Fine particulate silica | Fine particulate silica | Fine particulate silica |
| Viscosity average molecular weight | Ten thousand | 60 | 75 | 40 | 60 | 50 | | | 75 | 30 |
| Proportion by weight of a polyolefin having a molecular weight of not less than 1,000,000 | % | 35 | 40 | 15 | 35 | 30 | | | 40 | 8 |
| Proportion by weight of a polyolefin having a molecular weight of not less than 100,000 | % | 4 | 1 | 10 | 4 | 3 | 4 | 4 | 1 | 12 |
| Ratio of PO* to hydrophilic fine particulate inorganic material | | 0.85 | 0.85 | 0.85 | 0.85 | 0.85 | 0.57 | 0.92 | 1 | 1 |
| Ratio of plasticizer to fine particulate silica | | 2.4 | 2.4 | 2.4 | 2.4 | 2.4 | 2.0 | 2.25 | 2.35 | 2.35 |
| Density | | 0.96 | 0.96 | 0.96 | 0.96 | 0.96 | 0.96 | 0.96 | 0.96 | 0.97 |
| Pore volume | mm$^3$/g | 1107 | 1070 | 1034 | 970 | 1020 | 1150 | 950 | 800 | 850 |
| Average pore size | μm | 0.024 | 0.024 | 0.024 | 0.028 | 0.029 | 0.025 | 0.022 | 0.03 | 0.03 |
| Maximum in pore diameter distribution | μm | 0.011 | 0.011 | 0.011 | 0.017 | 0.018 | 0.011 | 0.010 | 0.021 | 0.025 |
| Electric resistance | Ω · 100 cm$^2$/separator | 0.0016 | 0.0017 | 0.0018 | 0.0014 | 0.0014 | 0.0012 | 0.0018 | 0.003 | 0.0015 |
| Surface wetability by a waterdrop | Second | 140 | 150 | 130 | 120 | 120 | 110 | 180 | 560 | 130 |
| MD tensile strength | kg/cm$^2$ | 34 | 100 | 30 | 34 | 32 | 30 | 40 | 100 | 28 |
| Retention of tensile elongation in notch MD direction | % | 37 | 40 | 28 | 37 | 30 | 37 | 37 | 40 | 20 |
| Thermal resistance | % | 0 | 0 | 0 | 0 | 0 | 0 | 0 | 0 | 25 |
| Weldability | % | 0 | 3 | 0 | 0 | 0 | 0 | 0 | 3 | 0 |
| Resistance to stress-cracking | % | 0 | 0 | 0 | 0 | 0 | 0 | 0 | 0 | 50 |

*PE:polyethylene, PP:polypropylene, PO:polyolefin

3. A separator for metal/halogen batteries according to claim 1 or 2, which has an average pore diameter of less than 0.03 μm and a pore diameter distribution having a maximum in a range of 0.01 to 0.02 μm.

4. A separator for metal/halogen batteries according to claim 1 or 2, wherein said polyolefin is a polyethylene.

* * * * *